United States Patent
Estehghari et al.

(10) Patent No.: US 9,589,143 B2
(45) Date of Patent: Mar. 7, 2017

(54) SEMI-TRUSTED DATA-AS-A-SERVICE PLATFORM

(71) Applicant: Xerox Corporation, Norwalk, CT (US)

(72) Inventors: Saghar Estehghari, La Tronche (FR); Nicolas Guerin, Notre-Dame-de-Mésage (FR); Nicolas Monet, Montbonnot-Saint-Martin (FR)

(73) Assignee: XEROX CORPORATION, Norwalk, CT (US)

( * ) Notice: Subject to any disclaimer, the term of this patent is extended or adjusted under 35 U.S.C. 154(b) by 57 days.

(21) Appl. No.: 14/255,252

(22) Filed: Apr. 17, 2014

(65) Prior Publication Data

US 2015/0304315 A1 Oct. 22, 2015

(51) Int. Cl.
- *H04L 29/06* (2006.01)
- *G06F 21/60* (2013.01)
- *H04L 9/08* (2006.01)
- *H04L 9/32* (2006.01)
- *G06F 17/30* (2006.01)

(52) U.S. Cl.
CPC ...... *G06F 21/602* (2013.01); *G06F 17/30595* (2013.01); *H04L 9/0822* (2013.01); *H04L 9/0825* (2013.01); *H04L 9/0863* (2013.01); *H04L 9/0866* (2013.01); *H04L 9/3226* (2013.01); *H04L 63/045* (2013.01);
(Continued)

(58) Field of Classification Search
CPC ............. H04L 63/0853; H04L 63/0807; H04L 63/083; H04L 9/3234; H04L 63/045; H04L 9/0822; H04L 9/0825; H04L 9/0863; H04L 9/0866; H04L 9/3226; G06F 21/602; G06F 17/30595
See application file for complete search history.

(56) References Cited

U.S. PATENT DOCUMENTS

2008/0031447 A1* 2/2008 Geshwind ............. H04L 9/0822 380/46
2010/0318587 A1* 12/2010 Seet .................. G06F 17/30306 707/791

(Continued)

OTHER PUBLICATIONS

U.S. Appl. No. 14/107,477, filed Dec. 17, 2013, Meunier, et al.
(Continued)

*Primary Examiner* — Kendall Dolly
(74) *Attorney, Agent, or Firm* — Fay Sharpe LLP

(57) ABSTRACT

A system and method provide for shared access to a database in a semi-trusted platform. In the method, for each of a set of users, provision is made for regenerating a respective user key, based on a respective predefined user input, such as a hashed password. One or more of the users is authorized to have access to an encrypted database. For each of these, the method includes encrypting a key for the encrypted database with the respective user's user key to generate an encrypted database key. During a user session, one of the authorized users is provided with access to the encrypted database by decrypting the database key from the encrypted database key with the respective user's user key, and decrypting the database, from the encrypted database, with the database key. The database key and each user's user key are not stored on the platform and are thus inaccessible to platform administrators and unauthorized users between user sessions.

17 Claims, 13 Drawing Sheets

(52) U.S. Cl.
CPC ........ *H04L 63/083* (2013.01); *H04L 63/0807* (2013.01); *H04L 63/0853* (2013.01)

(56) References Cited

U.S. PATENT DOCUMENTS

| | | | | |
|---|---|---|---|---|
| 2013/0191650 A1* | 7/2013 | Balakrishnan | ...... | G06F 21/6227 713/190 |
| 2014/0059341 A1* | 2/2014 | Edwards | ............. | G06F 21/6209 713/152 |
| 2014/0075199 A1* | 3/2014 | Hiwatari | ................... | H04L 9/14 713/176 |
| 2014/0143548 A1* | 5/2014 | Wang | .................... | H04L 9/0897 713/171 |
| 2015/0117624 A1* | 4/2015 | Rosenshine | ............. | H04L 67/22 379/142.04 |

OTHER PUBLICATIONS

Dunston, Duane, "h2H Messenger," pp. 1 - 3, downloaded at https://github.com/learnsia/h2HMessenger, on Feb. 18, 2014.

Hanyurwimfura, D., et al., "Text format based relational database watermarking for non-numeric data," Intern'l Conf. on Computer Design and Applications (ICCDA), vol. 4, pp. 312 - 316 (Jun. 2010).

Li, Yingjiu, et al., "Fingerprinting Relational Databases: Schemes and Specialties," *IEEE Trans. Dependable Secur. Comput.* 2, 1, 34-45 (Jan. 2005).

Odeh, A., et al., "Watermarking relational database systems," First Intern'l Conf. on the Applications of Digital Information and Web Technologies (ICADIWT 2008), pp. 270 - 274 (2008).

Popa, R.A., et al., CryptDB: protecting confidentiality with encrypted query processing. Proc. 23rd ACM Symp. on Operating Systems Principles (SOSP '11), pp. 85-100, ACM (2011).

Zhang, L, et al., "Relational databases watermarking for textual and numerical data," Intern'l Conf. on Mechatronic Science, Electric Engineering and Computer (MEC), pp. 1633-1636 (Aug. 2011).

CipherCloud, "Adopt the cloud," pp. 1-4, downloaded at http://www.ciphercloud.com/ on Feb. 18, 2014.

Amazon, "Amazon RDS for Oracle database," pp. 1-7, downloaded at aws.amazon.com/rds/oracle/ on Feb. 18, 2014.

Amazon, "Amazon RDS for Oracle Now Supports Transparent Data Encryption and Native Network Encryption," p. 1, downloaded at aws.amazon.com/.../amazon-rds-oracle-encryption on Feb. 18, 2014.

Wikipedia, "Trusted System," pp. 1-5, downloaded at http://en.wikipedia.org/wiki/Trusted_system on Feb. 18, 2014.

Windows Azure, "SQL Database," pp. 1-3, downloaded at http://www.windowsazure.com/en-us/services/data-management/ on Feb. 18, 2014.

\* cited by examiner

SEMI-TRUSTED DATA-AS-A-SERVICE PLATFORM

BACKGROUND

The exemplary embodiment relates to service platforms and finds particular application in connection with a system and method for providing security to a DaaS platform.

The expansion of Cloud Computing, where computing resources are provided on demand to the user, has allowed providers to offer different services to groups of users. Examples of these include Infrastructure-as-a-Service (IaaS), Platform-as-a-Service (PaaS), Software-as-a-Service (SaaS), and more recently, Data-as-a-Service (DaaS).

A Data-as-a-Service platform provides access to data sets, i.e., databases and files, through a remote access. In such a system, there are one or several data providers, who publish and control the data on the platform, and one or several data consumers, who can query, download and use the data. Like the other "as a service" offerings, DaaS relies on dedicated platforms that do not need to be located near the place where the data is actually used and which are accessed through web services, mashups (web application hybrids), mobile applications, and the like. Such platforms are not typically operated by the owners of the data.

The DaaS solution offers many benefits to data users and providers. For data providers, it brings flexibility and cost effectiveness without the need for upfront investment. Providers do not need to buy and maintain dedicated hardware or software, since a simple subscription service provides all the resources needed, for example, with a service level agreement. The resources are usually made available within a few minutes, depending on the solution provider. The subscription can be stopped at any time, since it is generally a pay-per-use model. For data consumers, the DaaS solution also makes the use of the system much easier by providing a uniform and well-documented API (as it is standardized across all providers) and generally by providing a better quality of service as compared to private servers. Another benefit for both data consumers and providers is often better security and a more standardized configuration over the platform, since public cloud systems are much more visible and susceptible to unauthorized access.

However, there are some disadvantages with DaaS platforms. For example, even though the security aspects have been addressed in part, most DaaS services lack the means to address data privacy and security solutions over the stored data sets. As a result, an attack could result in the disclosure of data and the users' privacy being compromised. This creates a problem of trust. When using a DaaS, the user's data resides on the computer infrastructure of the platform provider. While the provider may implement security measures to provide data privacy, this can come at a cost. One issue is therefore how much privacy is sufficient. The provider may need to consider protection against external attacks and also internal attacks coming for the service provider's employees or others with access to the user's data. Thus, depending on the level of trust that the user has in the platform, there may be a need for demonstrating that the service provider is protecting the data and user's privacy against the service provider itself.

The level of the trust that a user has in a system has an impact on the way that the security architecture of a platform is designed. Currently, computing platforms are classified, in terms of trust, in two ways: trusted and non-trusted. A "trusted system" is a system that is relied upon to a specified extent to enforce a specified security policy. The user, in turn, trusts the service to handle the security aspect properly. A trusted DaaS platform may provide confidentiality and privacy of the data by implementing encryption solutions in which an encryption key resides on and is managed by the platform. This kind of system simplifies the user experience, as the user does not need to handle the complications of key management, encryption mechanisms, and so forth. However, there is still the risk that administrators of the platform, as well as attackers who gain administrator privileges, may be able to access the user's data and decrypt it. A "non-trusted system" is one where the user does not trust the service to handle the data privacy and security properly, and thus the user implements a desired privacy mechanism, e.g., by encrypting the data before it is sent to the system. In this situation, it is up to the user to manage the encryption keys (generation, storage and sharing). While this solution generally provides the best privacy from the user perspective, it is also much more complicated to implement as the users need to have a good security knowledge. Moreover, while are already many DaaS vendors, few of them provide cryptographic solutions to users.

As an example, one cloud solution provider of data storage services, Amazon, offers two solutions for data encryption: Server Side Encryption and Client Side Encryption. In the former, the company handles both the key management and the cryptographic mechanisms (trusted platform), while in the second, it only provides storage for encrypted data, and it is up to the end-user to manage keys and implement cryptographic procedures (non-trusted platform). Another service offered is a Relational Database Service, which provides an SQL storage platform. In this option, data can be stored in plaintext or in ciphered form using Oracle Transparent Data Encryption. The Oracle engine encrypts the entire database files on disk (a trusted platform). However, there is no option for single column encryption. Microsoft is another DaaS solution provider. Its SQL Azure platform does not currently support encryption and decryption of the data at the database level (a non-trusted platform). Another platform provider, CipherCloud, provides access to non-trusted DaaS providers via a cryptographic gateway. The gateway provides the cryptographic mechanisms while the key management is performed locally on the client side. This solution provides some assistance to users in handling the cryptographic complications that clients face in using non-trusted platforms.

The trust that providers of the data have in authorized users is another consideration. There is a risk that data consumers may handle the data in an unauthorized manner, such as by distributing the data publicly. Various solutions have been proposed for watermarking and fingerprinting of databases. In such techniques, database rows are chosen sequentially or are grouped or partitioned. Then, the fingerprint or watermark string is hidden in attributes of those rows where their data type is String, Integer or Date. See, for example, Odeh, et al., "Watermarking relational database systems," First Intern'l Conf. on the Applications of Digital Information and Web Technologies (ICADIWT 2008), pp. 270-274 (August 2008); Hanyurwimfura, et al., "Text format based relational database watermarking for non-numeric data," Intern'l Conf. on Computer Design and Applications (ICCDA), vol. 4, pp. 312-316 (2010); Zhang, et al., "Relational databases watermarking for textual and numerical data," Intern'l Conf. on Mechatronic Science, Electric Engineering and Computer (MEC), pp. 1633-1636 (2011). However, adapting such techniques to the DaaS platform automatically is challenging, since the platform is generally composed of various databases with different data type structures.

There remains a need for a system and method which provides users with a level of assurance that their data will not be misused without the complexities of existing systems.

INCORPORATION BY REFERENCE

The following references, the disclosures of which are incorporated herein by reference in their entireties, are mentioned:

U.S. Pub. No. 20130191650, published Jul. 25, 2013, entitled METHODS AND APPARATUS FOR SECURING A DATABASE, by Hari Balakrishnan, et al., discloses a method and apparatus for a system to maintain confidentiality of data in a database management system by selecting encryption schemes for data items, storing encrypted data in databases, transforming SQL queries to run over encrypted data, and executing queries over encrypted data on the database server.

U.S. application Ser. No. 14/107,477, filed Dec. 17, 2013, entitled PRIVACY-PRESERVING EVIDENCE IN ALPR APPLICATIONS, by Jean-Luc Meunier, et al. discloses encryption schemes for license plate recognition applications.

BRIEF DESCRIPTION

In accordance with one aspect of the exemplary embodiment, a method for providing shared access to a database includes, for each of a set of users, providing for regenerating a respective user key based on a respective predefined user input to a system. For each of the set of users that is authorized to have access to an encrypted database, encrypting a database key for the database, with the respective user's user key, to generate an encrypted database key. One of the authorized users is provided with access to the encrypted database during a user session by decrypting the database key from the encrypted database key with the respective user's user key. The database is then able to be decrypted, from the encrypted database, with the database key. The database key and each user's user key are inaccessible to the system between user sessions.

At least one of the providing for generating the respective user key, encrypting of the database key, and providing one of the authorized users with access is performed with a processor.

In accordance with another aspect of the exemplary embodiment, a system for providing shared access to an associated database includes a user authentication component which is configured for receiving a hashed password for a user and generating a respective user key based on the hashed password and a stored salt. For each of a set of users that is authorized to have access to an encrypted database, a database encryption component encrypts a database key with the respective user's user key to generate an encrypted database key. The database key is configured for decrypting the database from the encrypted database. A database access component provides access to the encrypted database when an authorized user submits the respective hashed password, whereby the respective user key is generated and used to decrypt the encrypted database key to generate the database key for decryption of the database. A processor implements the user authentication component, database encryption component, and database access component.

In accordance with another aspect of the exemplary embodiment a method for providing shared access to a database on a semi-trusted platform includes, on an application server of the platform, during a user session, receiving a hashed user password and a user identifier from a client device in communication with the application server, a user key is generated by hashing the user password with a salt generated from the user identifier. With the user key, a database key is decrypted from an encrypted database key. With the database key, a database is decrypted from an encrypted database on the platform to provide database data that is accessible to the user. The user session is terminated. The hashed user password, user key, and the database key are not stored on the platform after the termination of the user session, so that the database key is not available for decrypting the database until a user key is subsequently generated.

At least one of the generating of the user key, decrypting of the database key, and decrypting the encrypted database may be performed with a processor.

DETAILED DESCRIPTION

Figure 1:
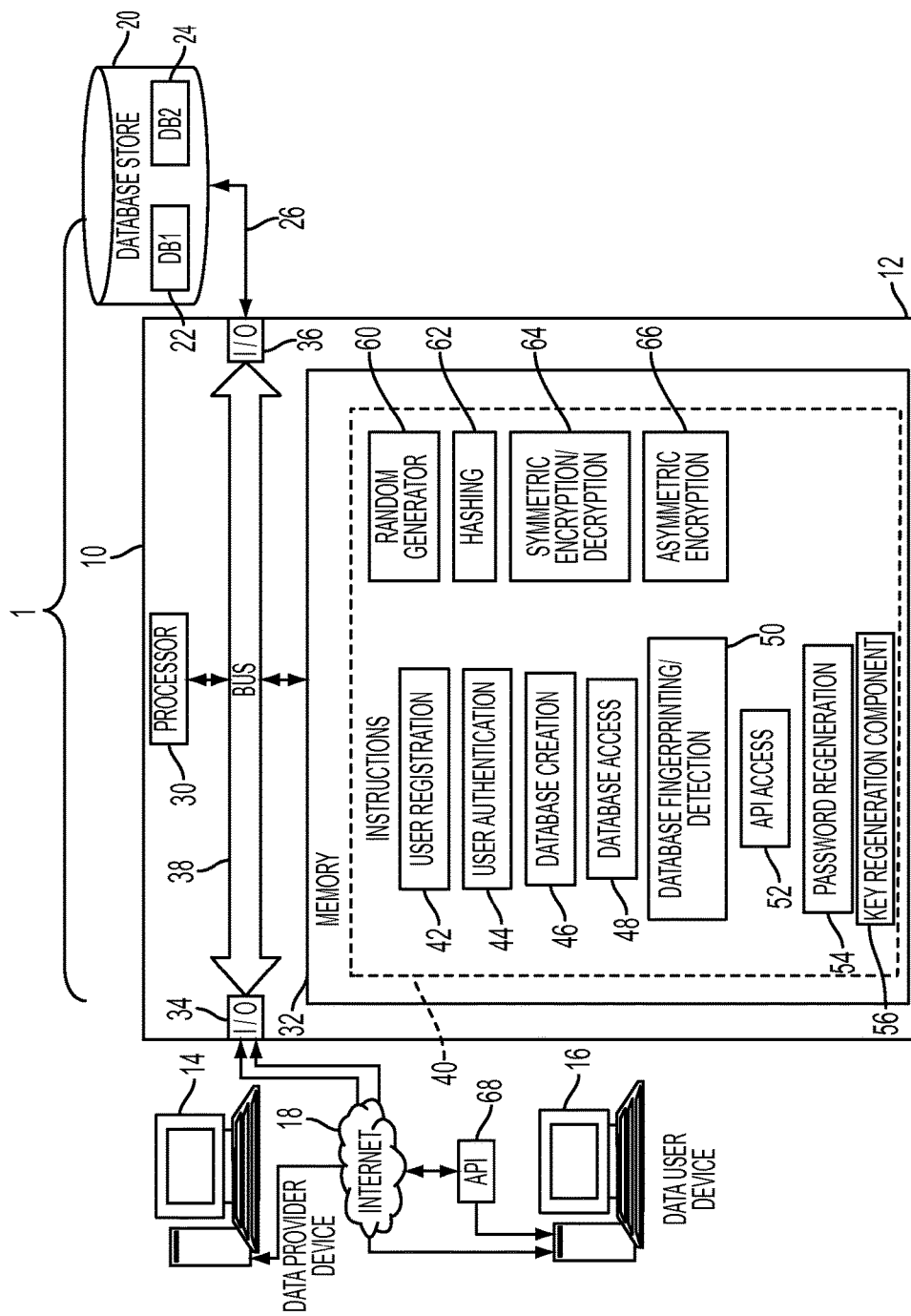
FIG. 1 is a functional block diagram of an environment in which a semi-trusted data encryption system operates in accordance with one aspect of the exemplary embodiment.

Aspects of the exemplary embodiment relate to a system and method for providing semi-trusted security mechanisms that are offered and enforced at the level of a data exchange platform, such as a Data-as-a-Service (DaaS) platform. With such mechanisms, users can exchange confidential data without trusting the platform, but also without managing the complex security protocols themselves.

Users of the system include data providers (owners) and data users (customers). Some or all of the users may be both owners and customers.

The semi-trusted system and method can be considered as being intermediate trusted and non-trusted systems. A semi-trusted platform is one where users do not need to implement complex cryptography schemes and to manage the encryption keys as in non-trusted ones, and where the data privacy is protected from legitimate or malicious administrators, as in trusted platforms. In the exemplary system, the platform is allowed to access and process the user data whenever the user is online and gives permission to the system. Except for such permitted uses and times, the data remains confidential and protected from unauthorized use by service providers and administrators.

The database created and any updates are encrypted with a database key that is decrypted from a user key that is based on the database provider's password. An encrypted database key is then generated by the platform for each of a set of trusted consumers. This asymmetric mechanism ensures that the platform and administrative operators will not gain access to the clear (unencrypted) content of the database. The database key and each user's user key, which is used for decryption of database key from the stored encrypted database key, are inaccessible to the system between user sessions.

One reason for using a DaaS platform is that data needs to be shared among various parties, i.e., data providers and data consumers. In such a system, the data consumers may be allowed to access the data and export it to their own computing devices. However there is always the risk that such data may be leaked or distributed by the user. Trust may thus become an issue for the data owners. Distributing the ciphered data is not a useful option nor is it useful to prohibit distributing the data at all. A supplementary mechanism of fingerprinting is optionally provided in order to mark the accessed records with the requester identity. Thus, the originator of a data leak may then be traced from such records. Fingerprinting is a class of information hiding techniques that insert digital marks into data with the purpose of identifying the recipients who have been provided data. See, Yingjiu Li, et al., "Fingerprinting Relational Databases: Schemes and Specialties," IEEE Trans. Dependable Secur. Comput. 2, 1, pp. 34-45 (January 2005), hereinafter, Li 2005. As a result, this mechanism gives the ability to the data providers to identify who was at the origin of the data distribution, i.e., which authorized data consumer actually leaked the data to unauthorized parties, and the ability to take appropriate actions. The data fingerprinting solution can thus fill the gap of trust between the different actors. First, the data owners are assured that they will be able to identify data leakers. Second, the consumers may become reluctant to distribute the data, as the users know that they can be traced.

The hashing performed in the exemplary methods discussed below generates a hash value (or "hash") based on at least one (generally, at least two or more) pieces of information. Given the hash value, the original piece(s) of information cannot be reconstructed (at least not without undue computational expense and a significant number of examples of such data). Where two or more pieces of information are used to form a hash, these are first combined, e.g., concatenated, in a predefined order.

The encryption keys used herein convert the information to binary data that can be represented as a string. The string can be decrypted to regenerate the original information with the same key, in the case of symmetric encryption, or with a different key, in the case of asymmetric encryption. In asymmetric encryption, two separate keys are employed: a secret (or private) key is used to decrypt data which has been encrypted or to create a digital signature, and a public key, which is mathematically linked to the secret key. The public key can be used to encrypt plain text or to verify the digital signature but is not able to decrypt the data.

With reference to FIG. 1, a functional block diagram of an environment in which a DaaS platform 1 operates is shown. The platform includes a computer-implemented system 10, which is configured to offer a DaaS service to clients who want to access, publish and share their data in a secure manner. The system 10 is designed to operate in a semi-trusted way, in which the privacy and the confidentiality of the data is preserved until the user, by being online, gives the permission to the system to access the data. In some embodiments of the system, the owners of the data may not have a high trust in the users of the data. In this embodiment, a data fingerprinting option is offered to the owners of the data, enabling them to track their data and identify unauthorized distributers.

The computer system 10 is hosted by an application server 12, which is capable of interacting with data providers and customers, operating respective client computing devices 14, 16, via wired or wireless network 18, such as the Internet. The server hosts or has access to a database store 20 which hosts encrypted databases 22, 24, etc., which have been uploaded by various providers. Where the database is hosted by one or more remote computing devices, access from the server 12 is via a secure link 26, to which database users generally have no direct access. The database store 20 and application server 12 form the DaaS platform 1 in the illustrated embodiment.

The illustrated computer system 10 includes a processor 30, which controls the overall operation of the computer system 10 by execution of processing instructions which are stored in memory 32 connected to the processor 30. Computer system 10 also includes one or more input/output interfaces 34, 36 for communication with external devices 14, 16, and database store 20. The various hardware components 30, 32, 34, 36 of the computer 12 may be communicatively connected by a bus 38. The processor 30 executes instructions for performing at least part of the method outlined in FIGS. 3-13.

Memory 32 stores instructions 40 for performing the exemplary method and optionally for performing other conventional operations of a DaaS platform. In particular, the system hosts a user registration component 42, a user authentication component 44, a database creation component 46, a database access component 48, a database fingerprinting and detection component 50, an application programming interface (API) access component 52, a password regeneration component 54, and a key regeneration component 56 which generates a password encryption and decryption key based on the answers to the security questions. Some of these components are optional, as described below. These components may incorporate or make use of various encryption services, such as a random number generator 60, a hashing service 62, a symmetric encryption/decryption service 64, and an asymmetric encryption service 66. These components are best understood with respect to the method below.

The computer system 10 may include one or more computing devices, such as a PC, such as a desktop, a laptop, palmtop computer, portable digital assistant (PDA), server computer, cellular telephone, tablet computer, pager, combination thereof, or other computing device capable of executing instructions for performing the exemplary method.

The memory 32 may represent any type of non-transitory computer readable medium such as random access memory (RAM), read only memory (ROM), magnetic disk or tape, optical disk, flash memory, or holographic memory. In one embodiment, the memory 32 comprises a combination of random access memory and read only memory. In some embodiments, the processor 30 and memory 32 may be combined in a single chip.

The network interface(s) 34, 36 allow(s) the computer to communicate with other devices via a computer network, such as a local area network (LAN) or wide area network (WAN), or the internet, and may comprise a modulator/demodulator (MODEM) a router, a cable, and and/or Ethernet port.

The digital processor 30 can be variously embodied, such as by a single-core processor, a dual-core processor (or more generally by a multiple-core processor), a digital processor and cooperating math coprocessor, a digital controller, or the like. The digital processor 30, in addition to controlling the operation of the computer 12, executes instructions stored in memory 32 for performing the method outlined in FIGS. 2-12.

The term "software," as used herein, is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

Figure 2:
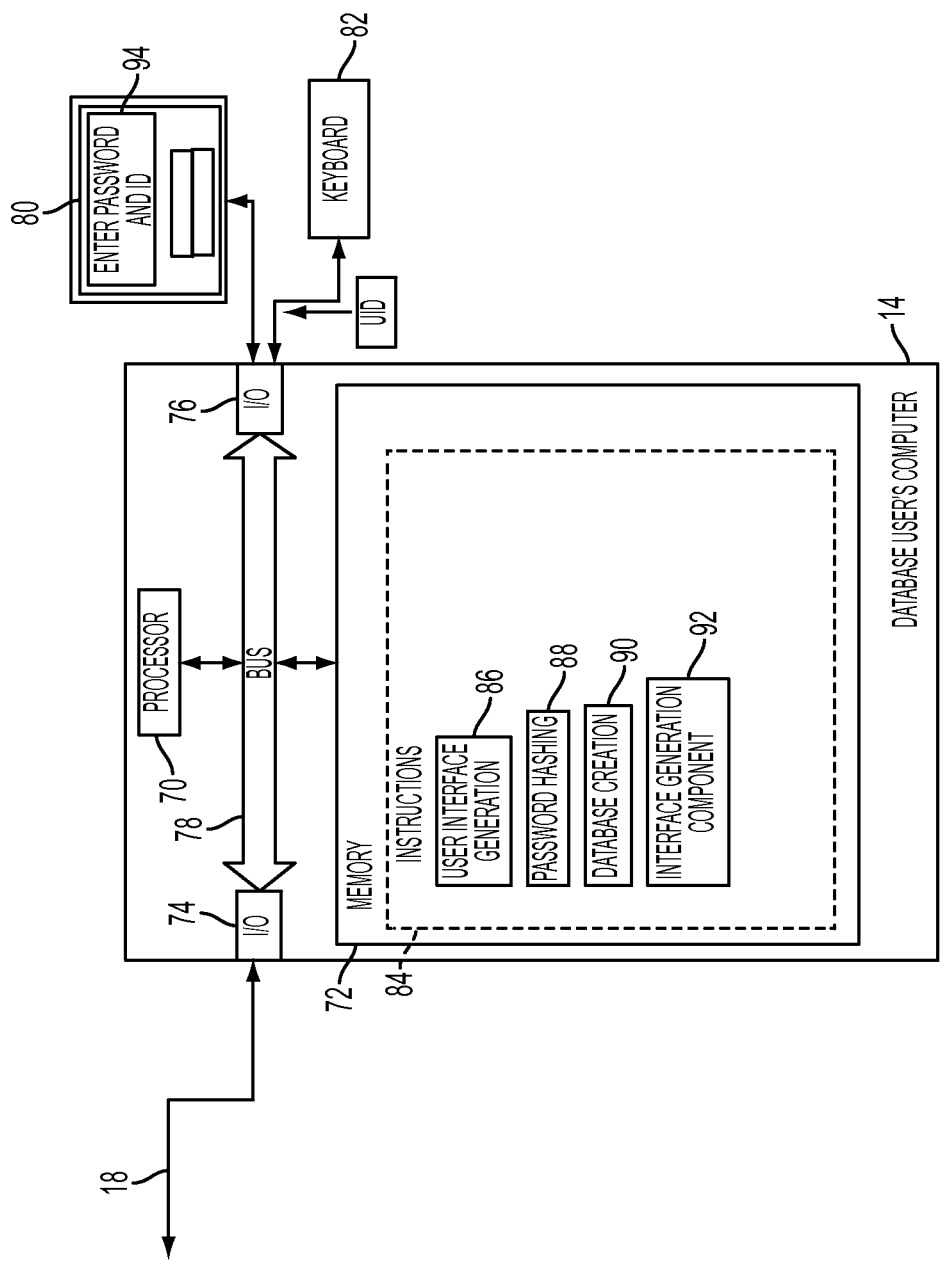
FIG. 2 is a flowchart illustrating a semi-trusted data encryption method in accordance with another aspect of the exemplary embodiment.

As illustrated in FIG. 2, each user device 14, 16 includes a processor 70, memory 72, input output devices 74, 76, and bus 78 analogous to device 12. An associated user interface includes a display device 80, such as an LCD screen or computer monitor, and a user input device 82, such as a keyboard, keypad, touchscreen or the like for entering commands which are received by the processor 70. Memory 72 stores instructions 84 for interacting with system 10 including a user interface generation component 86, which generates a user interface for interacting with the server, a password hashing component 88, a database creation component 90, and an interface generation component 92 for generating an interface 94 on the display for receiving the user's password and selection of answers to security questions. Hardware components 70, 72, 74, 76 of the user devices 14, 16 may be similarly configured to those of the application server 12, except as noted.

Figure 3:
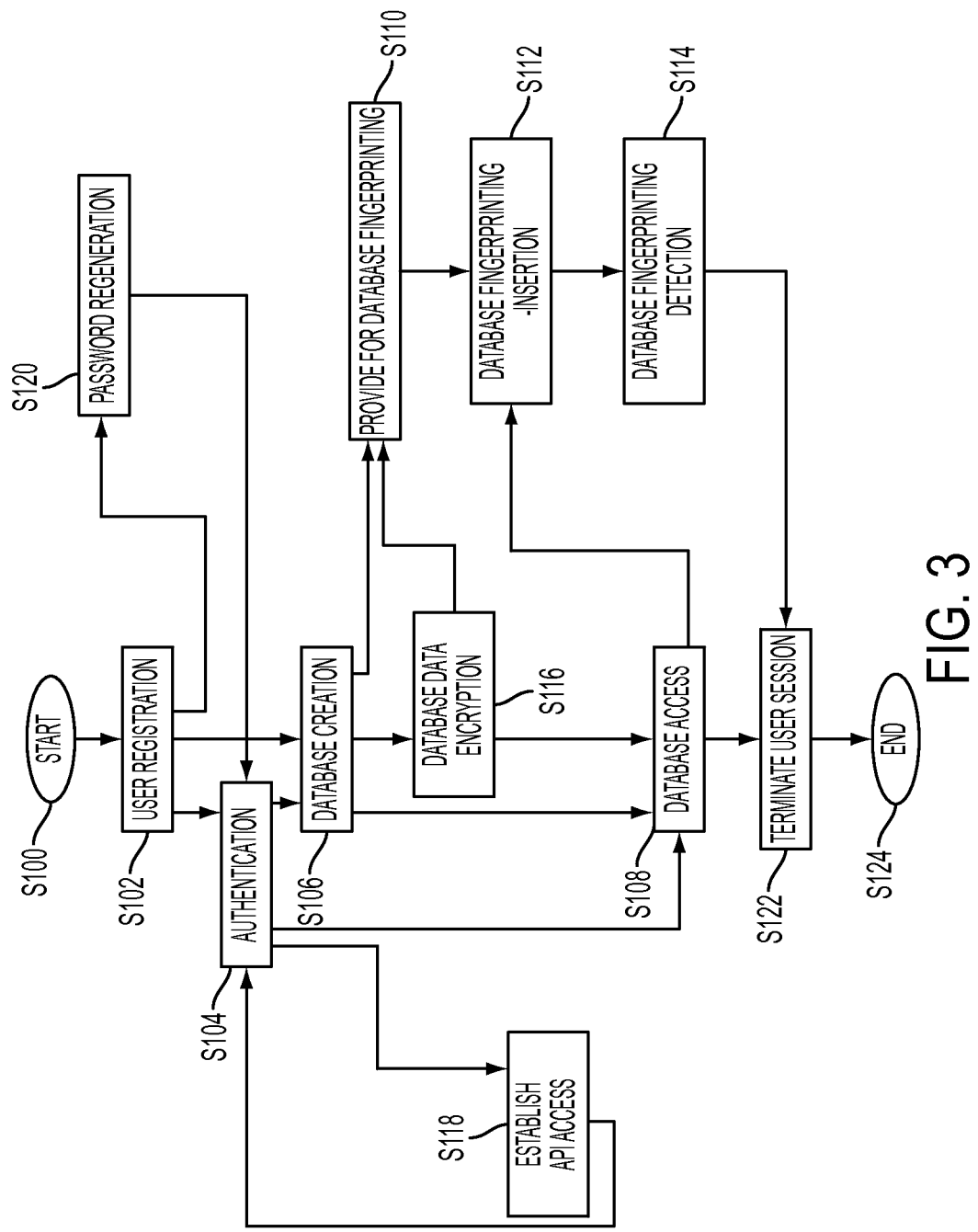
FIG. 3 is a flow chart illustrating registration of a user in the method of FIG. 2.

FIG. 3 provides an overview of the exemplary method for shared access of a database in a semi-trusted manner, specific embodiments of which are described with reference to FIGS. 4-13. The method begins at S100.

At S102, a new user, operating on a client device 14, 16, establishes a communication link with the server and registers with the system 10 by providing a (hashed) password and a user ID via the user interface 94. These are used by the registration component 42 to create a user key, which is encoded by the system with a one-way function. Optionally, a pair of PKI keys is randomly generated, if the user wishes to have access to the databases of other users. Registration is described in further detail with reference to FIG. 4. The method can then proceed to any one of steps S104 to S110 or S114-S122, depending on the purpose of the user session.

At each subsequent log on to the system (S104), the user undergoes an authentication process by resubmitting the hashed password, which is used by the authentication component 44 to regenerate the user key which is encoded and checked to see if it matches the previously stored encoded user key. Authentication is described in further detail with reference to FIG. 5.

At S106, a database may be created. In particular, a user who wishes to store a database in the store 20 submits the database 20, 22 (or data for its creation) to the system (after authentication, as described above). The database is received by the database creation component 46 of the system and stored in encrypted form in database store 20. A database key is created which is specific to that database and encrypted, by the database creation component 46, using the user's key. Database creation is described in further detail with reference to FIG. 6.

At S108, provision is made for a customer to access a previously created database 22. A user (customer) who wishes to access a database 22, does so by authentication (as for (S104)), with the regenerated user key thereafter being used by the database access component 48 to decrypt the encrypted database key (provided the customer has been granted access). The database key is then used to decrypt the database 22 temporarily for that user. The accessed database 22 is returned to its encrypted state (any unencrypted data generated during the user session being deleted from system memory) by the time the user ends the session (logs off the system and/or the client device 14, 16, 68 is no longer in communication with the server 12). Database access is described in further detail with reference to FIG. 7.

In some embodiments, the database creator wishes to provide for subsequent generation of a fingerprint which is unique to each user who accesses the database. At S110, which can be part of S106, the user identifies, to the fingerprinting component 50, those fields of the data in which the data can be modified to provide a fingerprint. Subsequently, at S112, which can be part of S110, a fingerprint unique to the user is inserted in the specified fields of the database data before a customer is permitted access, as described in further detail with reference to FIG. 8. At S114, if a data provider later provides evidence that the data has been disclosed, the customer who caused the disclosure can be identified from the unique fingerprint hidden in the data, as described in further detail with reference to FIG. 9.

In some embodiments, the database creator wishes to encrypt part of the data, which is performed at S116 by the database creation component 46, as described in further detail with reference to FIG. 10. Database data encryption encrypts some or all of the database data such that when the database is accessed by a customer authorized to have access the database, the data itself remains encrypted.

In some embodiments, a database user wishes to access a database via an API 68. In this embodiment, the API access component 52 provides a mechanism by which this is achieved through issuing, to the user, a token, a certificate which enables a limited time access, and a secret access key (S118), which can be provided to the API 68 for subsequent authentication and access to the database. The process of API access and refreshing the limited time certificate is described in further detail with reference to FIGS. 11-13.

In some embodiments, a user may wish to access the database but has lost the password. Access may be provided for by the password regeneration component 54, through a password regeneration method (S120), as described in further detail below.

At S122, the user session is terminated and the information which was temporarily stored on the platform is deleted, if this has not been done already. It is to be noted that the user key, as well as the hashed password from the user (or other user input in the case of an API) which was used to generate/regenerate the user key, and any database keys generated from it, as well as any decrypted database data, are all deleted from platform memory so that this information no longer exists in memory accessible to the system after the session ends. Any storage of this information during the user session is only temporary. Thus, neither the user device 14, 16, nor the system 10 stores the user key or database key permanently. The databases 22, 24, etc. thereafter remain inaccessible, i.e., encrypted, until the same or another user logs on, directly or indirectly via an API, and properly authenticates with the appropriate user input.

The method ends at S124.

As will be appreciated, the steps of the method need not all proceed in the order illustrated and fewer, more, or different steps may be performed.

Further details of the system and method will now be described. The following notation is used in the description:

KU—Key of a user
KD—Key of a database
KD'—Encrypted key of the database
PKU, SKU—public and secret key pair for a user
KM—Key for fingerprinting
KP—Key of the platform
K—Key for KM encryption
FP—Fingerprint Privacy, Confidentiality and Secure Data Sharing:

In the exemplary platform, the confidentiality of the data is provided by using one or more cryptography algorithms. The data is encrypted while at rest and it is only decrypted and becomes available when the user is online and wants to access it. All communications are made over a secure channel. In the exemplary embodiment, the system provides for privacy, confidentiality, and secure data sharing.

The key management process is primarily performed on the server side and the complications that would ensue are avoided on the client-side. However, as this is a semi-trusted system, it does not have direct access to keys used for encryption/decryption. This means that the privacy of the user is preserved while the user is offline.

1. Privacy of Users: Each user of the system 10 is associated with a password P, which may be selected at user registration time (S102). The user password is hashed and the hashed password HP is used to generate a key KU for the user. The user key is used to encrypt the data that corresponds to the user. However the user key is never saved on the server and it is recalculated at each user's login.

2. Confidentiality of data: For each encrypted database 22, 24 that is created through the system, a database key KD is randomly generated which can be used to encrypt the data that is stored in it. The key KD for accessing such data is shared among authorized users and can be encrypted with the KU of each of the users.

3. Secure Sharing of the data: The authorized users may not be online at the time of the key sharing. When they are not online, the system 10 does not have access to their user key KU. To address this, a pair of PKI public and secret (private) keys PKU, SKU is generated for each user at registration time, where the public key PKU is to be publicly available to the system and the secret key SKU is encrypted with the KU. At the key sharing time, the owner of the database specifies the authorized users and the system then encrypts the database's key KD with each authorized user's public key. At each user's login, the system can gain access to their KU and consequently their secret key, which then can be used to decrypt the database key KD and the user is able to access the encrypted data. The database key KD can then be encrypted with the user's key KU to avoid the need to continue with an asymmetric encryption (which is slower than symmetric algorithms).

4. Fingerprinting: As noted above, adapting conventional fingerprinting techniques to DaaS is challenging, since the platform is composed of various databases with different data type structures. The fingerprinting technique can be instantiated with different fingerprinting algorithms, since the data types might change from database to database. This makes the mechanism more dynamic.

In spite of the trust that the database owner has over the authorized users, the owner may decide to use a fingerprinting mechanism to be able to track and identify malicious distributors. Using this option is independent of the encrypted database.

The database owner may decide which columns of his database can be modified. This generally is done manually rather than being automated, as a column containing integers, for example, should not be modified if it contains unique identifiers, but may be slightly modified if it contains large, approximate numbers (e.g., number of page loads of a web site). For fingerprinting the database, an algorithm may be chosen based on the chosen columns' data types.

For fingerprinting, a new random fingerprinting key KM may be generated for each database. The random key KM is encrypted using a key that is derived from the key KU of the owner and the key of the system (KP). The fingerprint FP is generated using this key and the user's ID (only the authorized users). The fingerprinting key is never stored on the server. It is unique for each user of a database and it is different for the same user from database to database. The fingerprint that is supported in such a platform is generated and inserted into data dynamically at each user access.

The owner of a database, who finds that an extract of his database has been made public, for example, can use the platform to identify the distributor of the database.

Further details of the method will now be described.

A. User Registration (S102)

Figure 4:
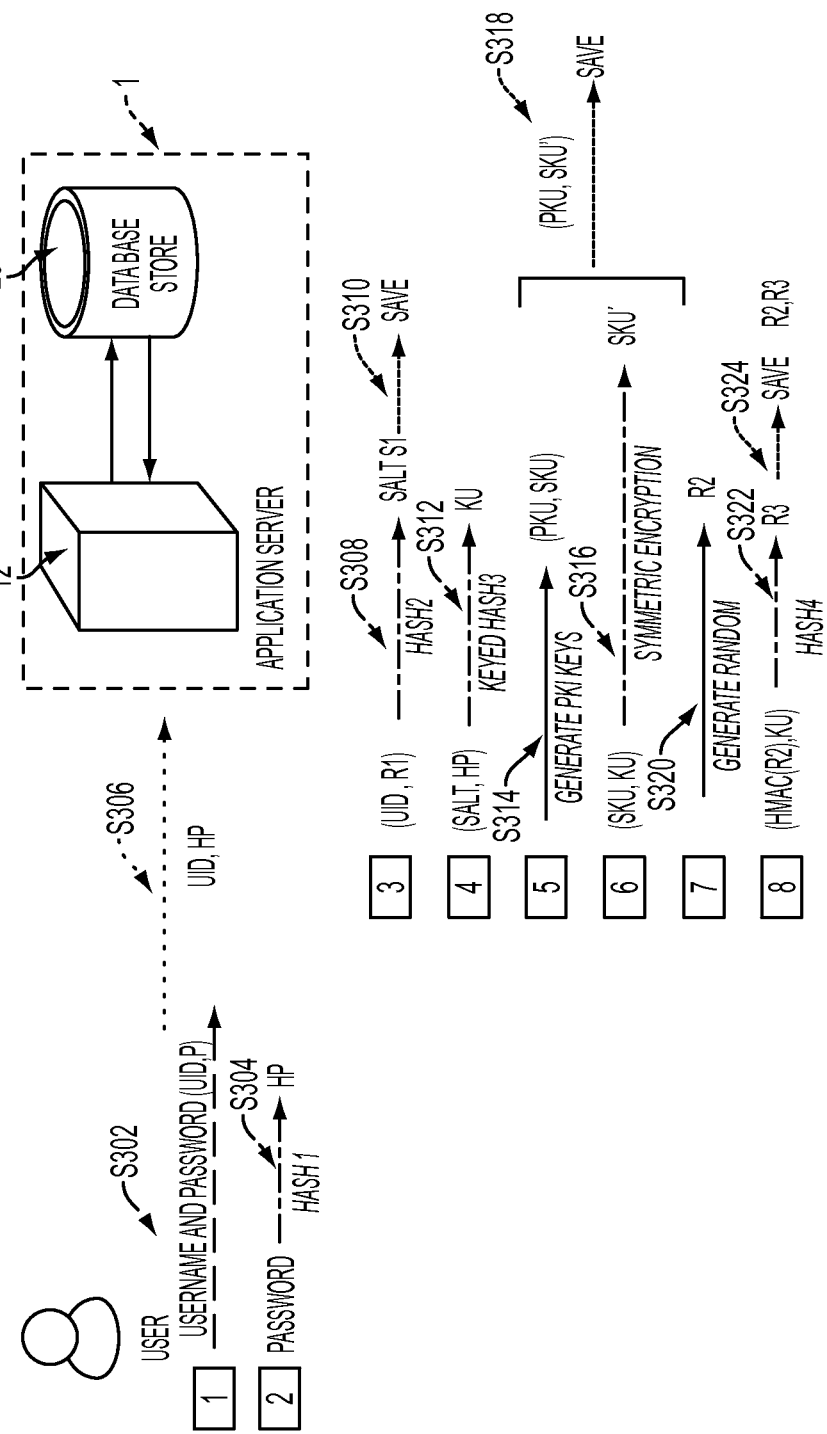
FIG. 4 is a flow chart illustrating user authentication in the method of FIG. 2.

With reference to FIG. 4, the following process may be implemented at user registration time (S102). On the client side:

1. The user chooses a unique username UID and a password P, which is received by the client device (S302).
2. The password is hashed on the client device (S304) using a one way hash function Hash1 to generate a hashed password HP, which is sent with the UID to the server (S306). While a user could send the password in unhashed form, passwords are generally short and easy to remember, and are sometimes used by a user for multiple websites. The hashed password thus provides a unique password with added security.

On the server:

3. A salt S1 is generated (S308) by hashing a random string R1 and the UID with a hash function Hash2, and the salt S1 is saved to memory (S310).
4. A user key KU is generated from the salt S1 and the hashed password HP using a one way keyed hash function Hash3 (S312).

5. A pair of PKI keys is provided or generated (public key PKU, secret key SKU) (S314).
6. The secret key SKU is encrypted with the user key KU using a symmetric encryption method to generate an encrypted secret key (SKU') (S316). PKU and SKU' are saved to memory (S318).

In order to avoid the need for storage of the password (for authentication):

7. Another random string (R2) is generated (S320).
8. A keyed hash message authentication code (HMAC) R3 of the random string R2 and the user key KU is generated using a keyed hash function (Hash4) (S322) and R2 and R3 are saved (S324). The HMAC is a short piece of information used to authenticate the user key KU and to provide integrity and authenticity assurances.

B. User Authentication (S104)

Figure 5:
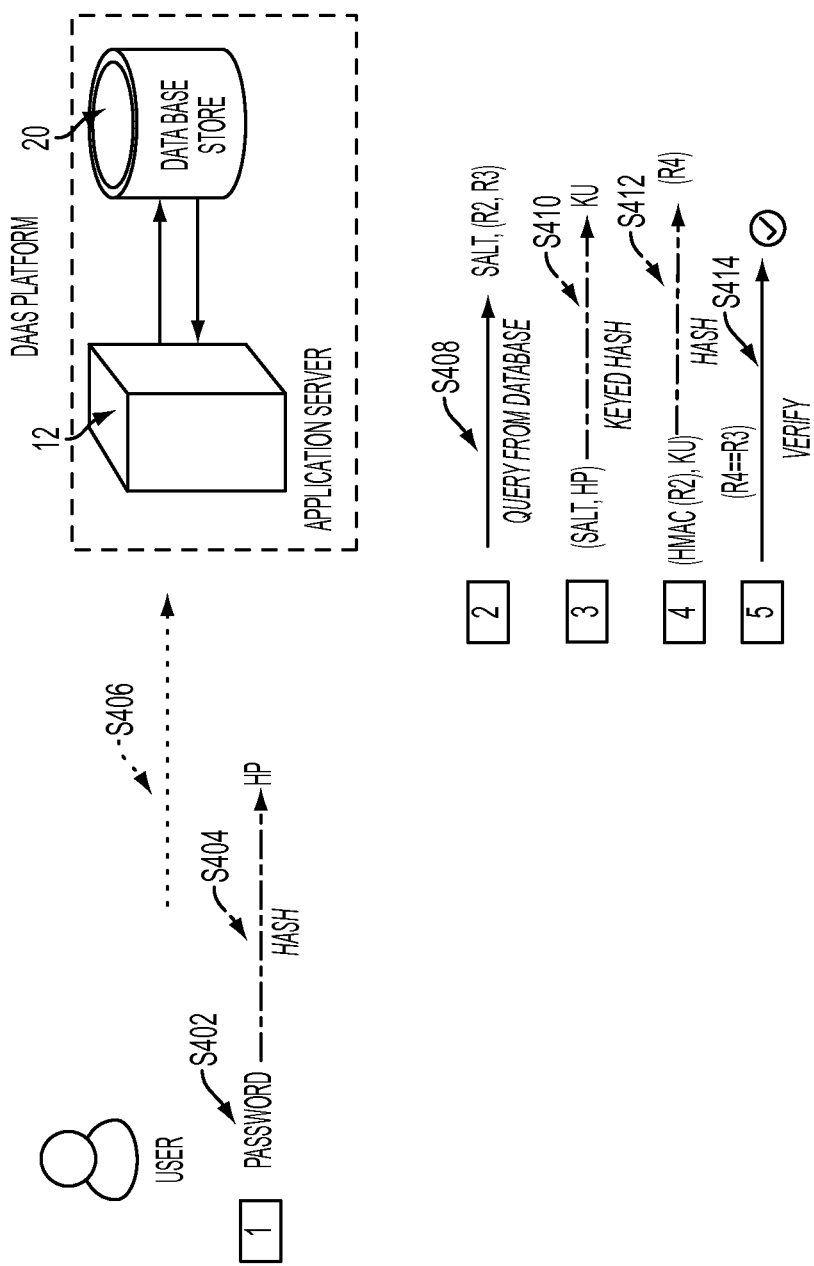
FIG. 5 is a flow chart illustrating database creation in the method of FIG. 2.

With reference to FIG. 5, the following process may be implemented at authentication time:

On the client side:
1. The user reenters his password P on the client device (S402), and it is hashed (S404), as for S304, to generate HP, and HP is sent to the server (S406).

On the server:
2. The salt S1 together with the HMAC R3 and the random string R2 are retrieved from the database (S408).
3. The KU is calculated using a keyed hashed function based on the hashed password HP and the salt S1 (S410).
4. The HMAC of the random string R2 (R4) is calculated using a keyed hash function based on the KU (S412).
5. If the generated HMAC R4 equals the saved one R3, then the user is authenticated (S412).

C. Database Creation (S106)

Figure 6:
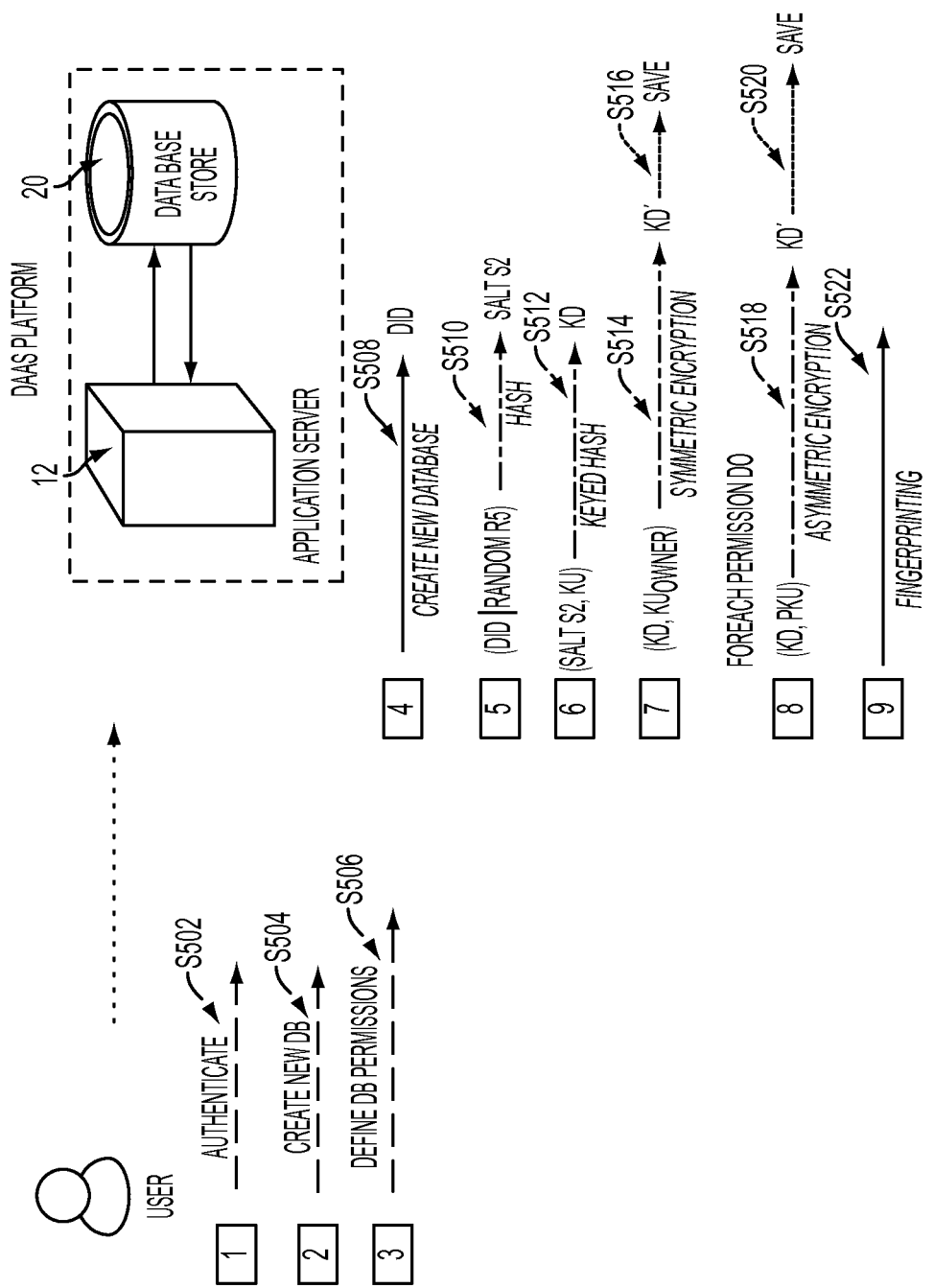
FIG. 6 is a flow chart illustrating database access in the method of FIG. 2.

With reference to FIG. 6, the following process may be implemented at database creation. Each legitimate user of the platform can create a database and become the owner of the database. On each database creation the following steps are taken. On the client side:

1. The database owner is authenticated to the system (S502), as described above for user authentication S104.
2. The user makes a request to create a new database (S504).
3. The owner defines the permissions over the database (S506).

On the server:
4. A new database D with a database identifier DID is created (S508).
5. A salt S2 is generated based on a random string R5 and the database's ID DID using a one way hash function (S510).
6. Having the salt S2 and the KU of the owner, a database key KD is generated using a keyed hash function (S512).
7. The database key KD is symmetrically encrypted with the user key KU of the owner (S514) and the symmetrically encrypted database key KD' thus formed is saved in system memory (S516).
8. Then the database key KD can be shared with other authorized users by being encrypted with their respective public key PKU using an asymmetric encryption function to generate a respective shared, asymmetrically encrypted database key KD' that is unique to each user (S520), which is saved in system memory (S522).
9. Optionally, the owner may decide to activate the fingerprint option for this database (S522) as described below for S110, S112.

D. Database Access (S108)

Figure 7:
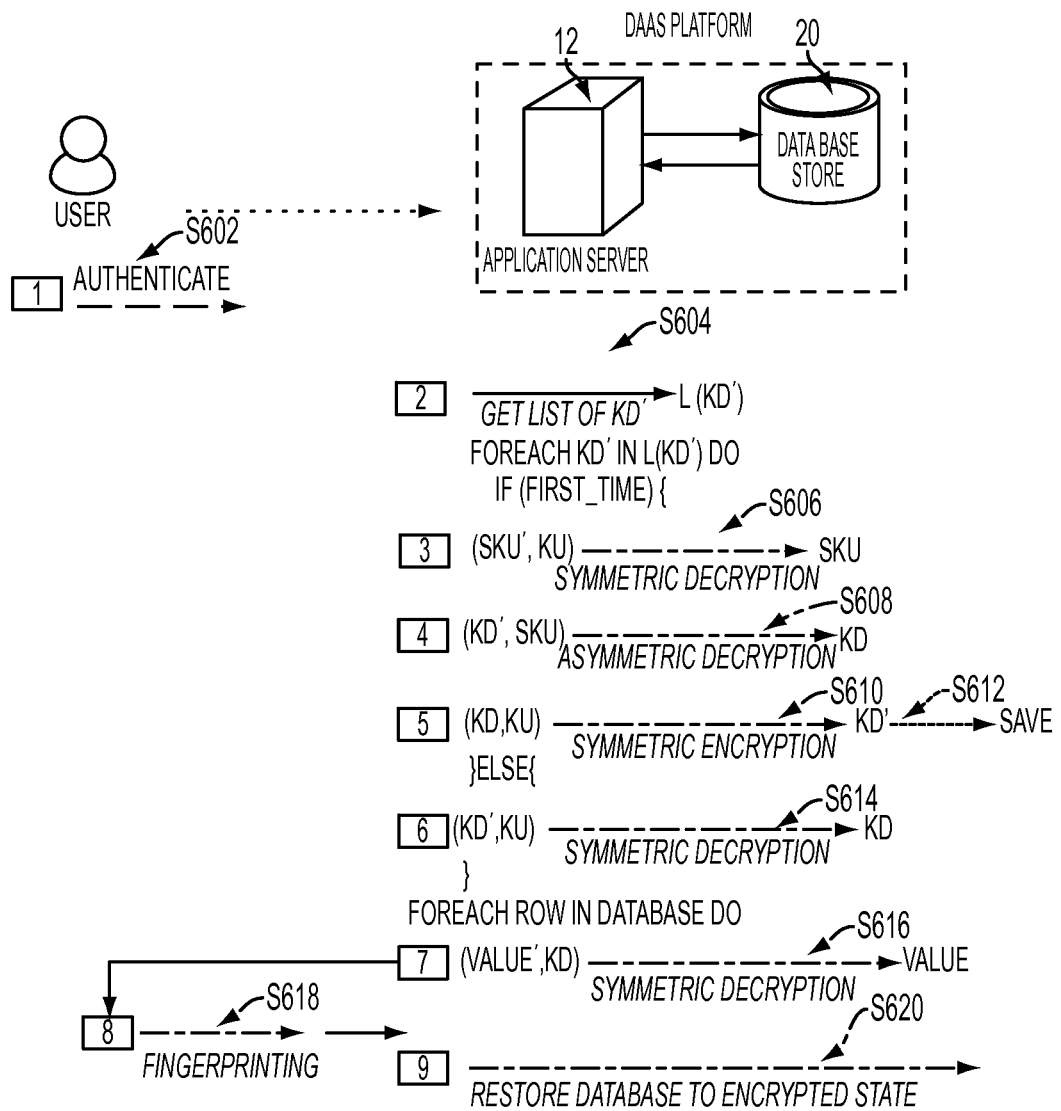
FIG. 7 is a flow chart illustrating database fingerprinting in the method of FIGS. 2, 5 and 6.

With reference to FIG. 7, when a user wants to access a database for which the user has permissions, the following steps may be taken. On the client side:

1. The user is first authenticated with the system (S602), as described above for user authentication (S104), which regenerates the user's own user key KU. The user requests access to a particular encrypted database 22.

On the server:
2. The list of encrypted database keys KD' is obtained (S604). If the user has been authorized access, one of these keys will be able to be unencrypted, based on that user's user key KU and secret key SKU.

If it is the first time that the user accesses that database, the asymmetrically encrypted data base key is first asymmetrically decrypted then symmetrically encrypted, as follows:

3. The secret key SKU of the user is decrypted from the encrypted secret key SKU' using the user's regenerated user key KU (S606).
4. The encrypted KD is decrypted from the asymmetrically encrypted database key KD' using the secret key (S608).
5. The KD is then encrypted, using the KU (S610), and the symmetrically encrypted database key KD' thus generated is saved on the database (S612). In this way for the next access to the database a symmetric decryption function can be used.

If this is not the first access or the user is the owner of the database:

6. The KD is decrypted using the KU of the user and a symmetric decryption function (S614).

Following S612 or S614, the method proceeds to S616 (or S618), where:

7. The encrypted data in the selected database is decrypted for this session, where the user can then query the data, download it, and/or perform other authorized actions on the data (S616).
8. If fingerprinting has been used, further steps are included (S618) prior to user access, as described for FIG. 8.
9. The database is returned to its fully encrypted state (e.g., by deletion of any decrypted data deleted from system memory, and deleting the database key KD) (S620) so that the database data is no longer accessible to anyone once the user session ends (user logs off or communication with the user device otherwise ends) and remains inaccessible until the access process described above is repeated by the same or another user (either directly, or through an API, as described below).

E. Fingerprinting (S110, S112)

The database fingerprinting, if used, may include two separate steps: Insertion, as illustrated in FIG. 8 and Detection, as illustrated in FIG. 9.

i. Insertion (S110)

Figure 8:
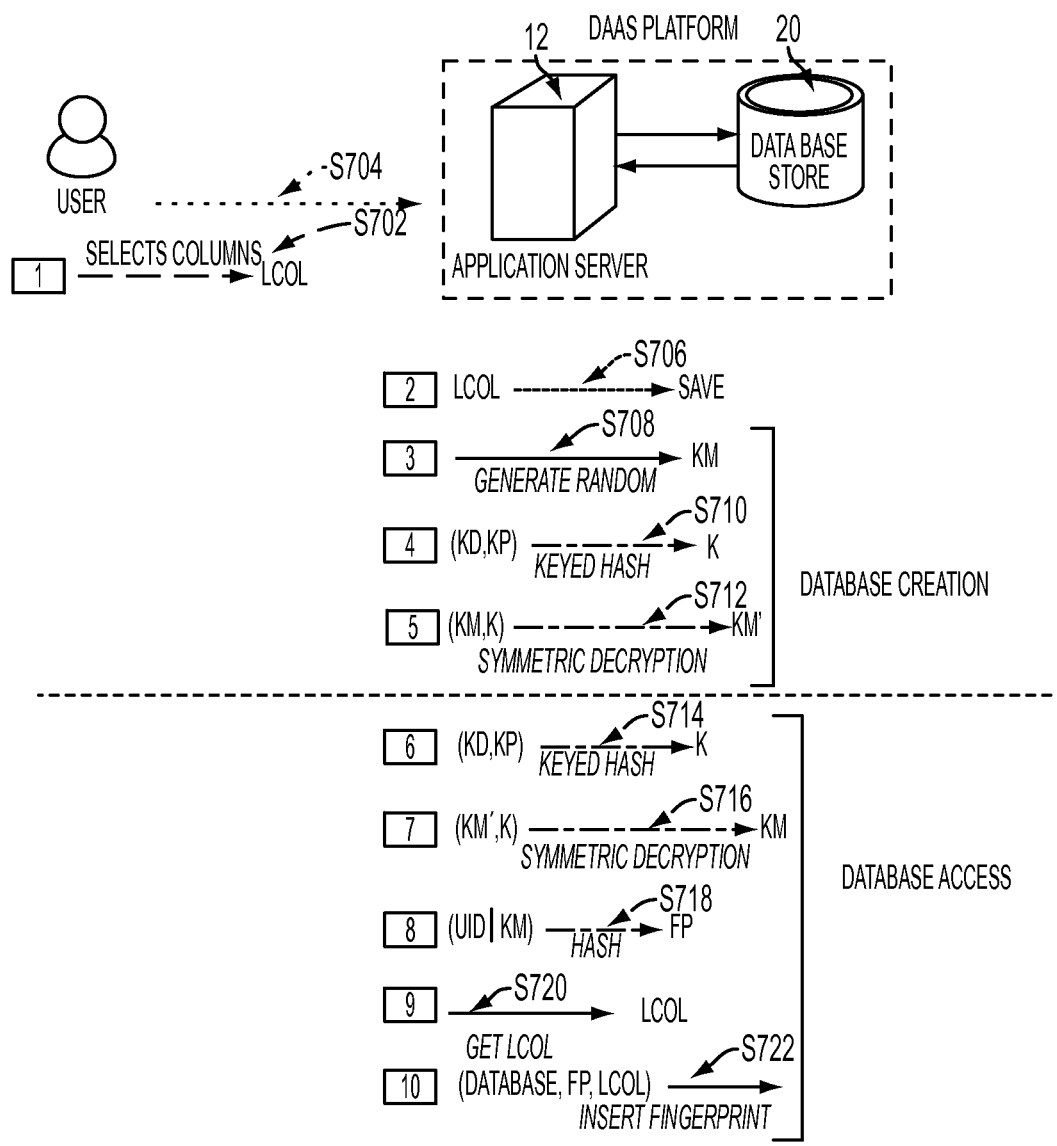
FIG. 8 is a flow chart illustrating detection of unauthorized access in the method of FIG. 2.
Figure 9:
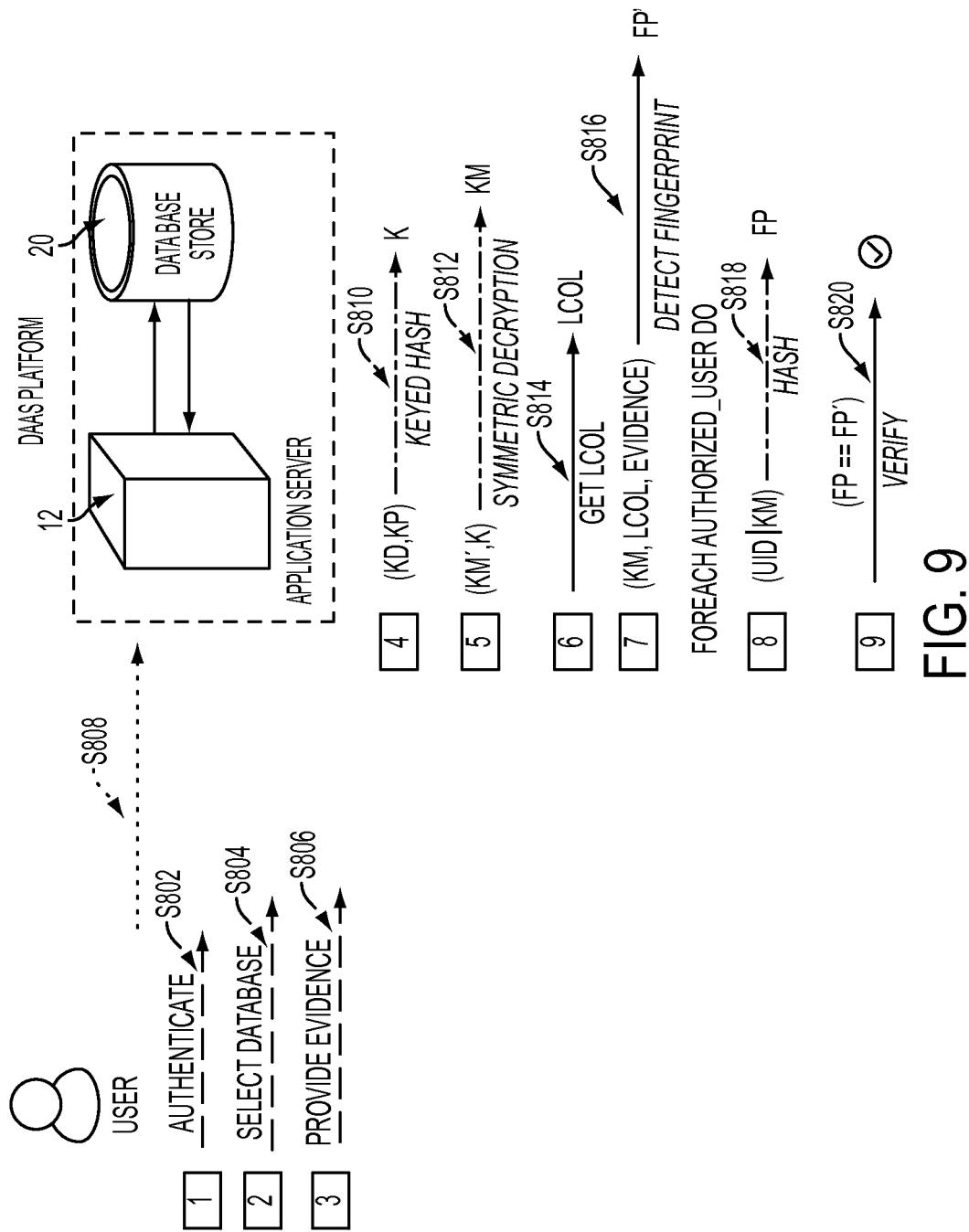
FIG. 9 is a flow chart illustrating database encryption in the method of FIG. 2.

As illustrated in FIG. 8, at the database creation stage (S106), the database owner may decide to activate the fingerprint option for this database. In this case the following steps are added to the Database Creation (S106) and Database Access (S108) stages:

a. Database Creation

On the client side:

1. The database owner chooses the parts of the database data, e.g., database columns, whose values can be changed to accommodate part of the fingerprint (S702). These are received by the server (S704).

On the server:

2. The information on column(s) selected for the fingerprint is saved (S706).
3. A fingerprinting key KM, such as a random string, is generated for fingerprinting the database (S708).
4. A new KM encryption key K is generated, e.g., by hashing the database key KD and a key generated for the platform KP (S710).
5. The fingerprinting key KM is then encrypted using the KM encryption key K with a symmetric encryption function to generate an encrypted fingerprinting key KM' (S712).

b. Database Access

Database access is where the data is distributed to the user and as a result, it is the place where the fingerprint is embedded into the data (S618, FIG. 7) before being accessed. On the server:

6. The KM encryption key K is generated by hashing the database key KD (regenerated for this customer as described above) and the key of the platform KP (S714).
7. The fingerprinting key KM is then decrypted from the KM encryption key K (S716), using the symmetric encryption function used earlier in S712.
8. Based on the KM and the user ID UID, a fingerprint FP, which is unique to the user for that database, is generated using a hash function (S718).
9. The database's column selection for fingerprinting is queried (S720).
10. An encryption algorithm is chosen according to the columns' data type and the fingerprint is inserted in the data (S722).

ii. Detection (S112):

In this stage the owner of the database, who may have found the whole or a part of his database over the network, can identify the distributor of the data. To do this the following steps may be taken, as shown in FIG. 9. At the client side:

1. The owner authenticates, wherein the user key KU is recalculated (S802), as described above for S104.
2. The owner chooses the database D over which he wants to perform the detection (S804).
3. The owner also provides the evidence (S806), which is sent to the system (S808).

On the server:

4. The KM encryption key K is generated by hashing the regenerated database KD and platform key KP (S810).
5. The fingerprinting key KM is then decrypted (S812), by submitting the KM encryption key K to the symmetric encryption function used previously at S716.
6. The column selection for the chosen database is automatically queried (S814).
7. Using the fingerprinting key KM and the column selection, a detection algorithm is run over the provided data. As a result of this, a fingerprint detection string FP' is generated (S816).
8. A list of all authorized users for this database D is queried. For each user in the list, a fingerprint FP is generated using the fingerprinting key KM and the user's ID UID. Each FP is then compared to FP' (S818).
9. If there is a match between FP and FP', a malicious distribution of the data can be identified and reported to the owner with a matching fingerprint giving the identity of the user who accessed the data that was distributed without authorization (S820).

Other extensions to the exemplary system and method are also contemplated For example:

F. Import and Export of a Database

In the exemplary platform, the data can also be imported or exported in the form of a file.

i. Export

In this embodiment, an authorized user can export the databases for which he or she has authorization. For exporting the database, the same steps as described above for database access and fingerprinting sections are first taken.

ii. Import

Figure 10:
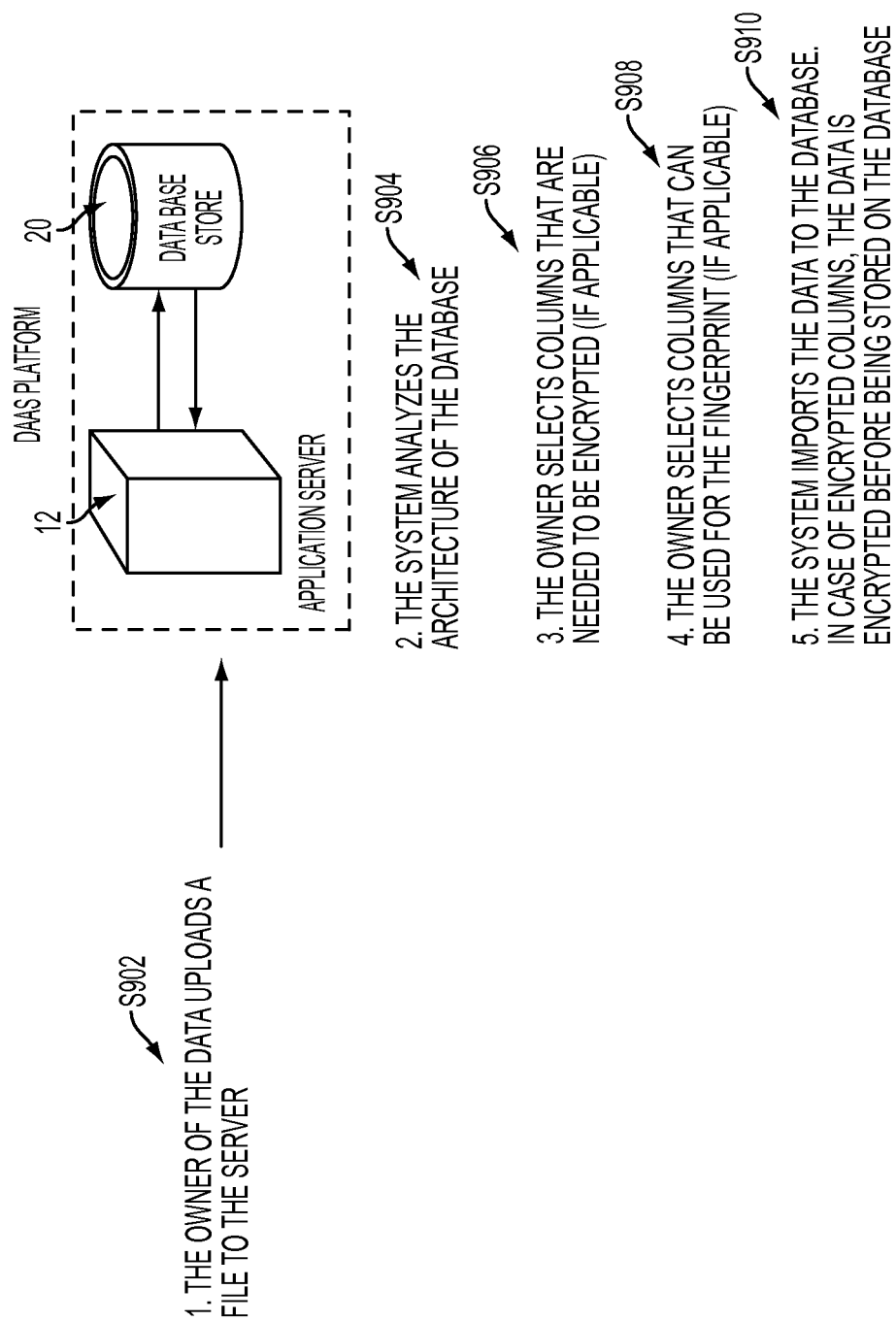
FIG. 10 is a flow chart illustrating database data upload in the method of FIG. 2.

The procedure for importing a database can be as for database creation (FIG. 5) with one or more additional step(s) as shown in FIG. 10. In importing a database, at the client side:

1. The owner of the data uploads a database file to the server (S902).

On the server:

2. The system analyzes the architecture of the database (S904).
3. The owner selects columns that are needed to be encrypted (if applicable) (S906).
4. The owner selects columns that can be used for the fingerprint (if applicable) (S908).
5. The system imports the data to the database store. In case of encrypted columns, the data is encrypted before being stored in the database store (S910).

G. API Access

Users may wish to access the data from their applications and services. This can be done by using an API (Application Programming Interface). This type of access is different from the website access described above. In the web interaction, it is assumed that the password is a secret and it is kept in the user's head. However, a password is a guessable string and should not be hard coded inside the applications.

Figure 11:
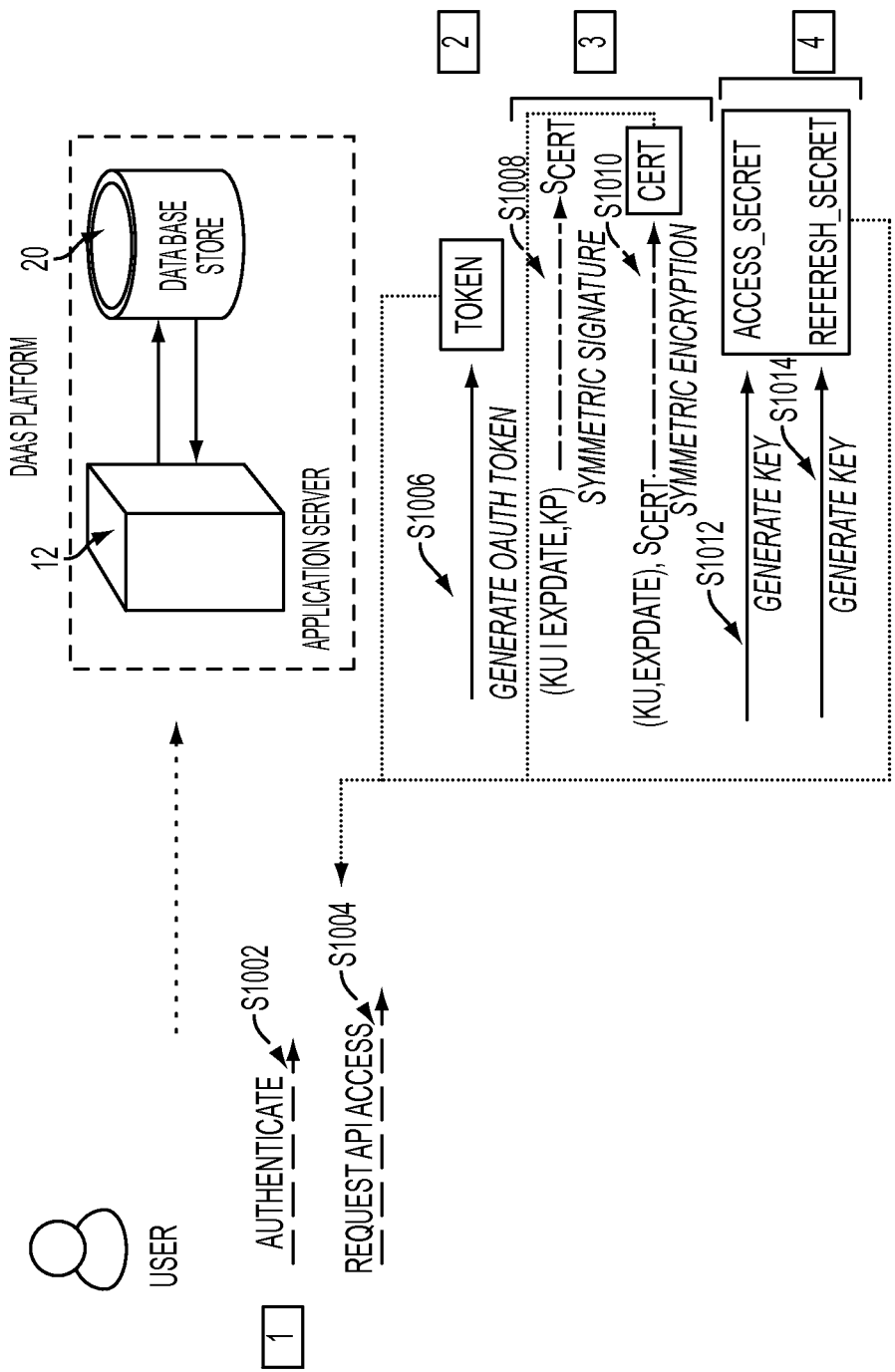
FIG. 11 is a flow chart illustrating providing a user with API access in the method of FIG. 2.

One problem that is faced with API access is that the system 10 cannot verify whether the call is coming from a legitimate user or not, unless a non-repudiation mechanism is integrated into the authentication process. In the following architecture for API call, such a mechanism is included. This can be implemented as shown in FIG. 11. On the client side:

1. A user who wants to have access to the data via API access first connects to the system through the web interface and authenticates (S1002), as described above for S104. Using a specific interface, the user requests an API access (S1004).

Given that the user has provided his/her password, the following steps are taken at the server, by the API access component 52:

2. An authentication token is generated which is to be used instead of the user's username and password (S1006).
3. The system calculates the KU and signs KU and the certificate expiration date ExpDate with the platform key KP, giving $S_{cert}$ (S1008) and encrypts KU, ExpDate and $S_{cert}$ to generate a certificate (S1010).
4. Two secret keys are randomly generated for the user (S1012, S1014), a secret access key access_secret and a secret refresh key refresh_secret. These two keys are used for non-repudiation purposes and sent to the user.

Note that all above security elements are substantially random and long enough to make the guessing process difficult for an attacker. Also it is assumed that the pair of keys access_secret, refresh_secret is saved in a secure way on the clients' device.

Figure 12:
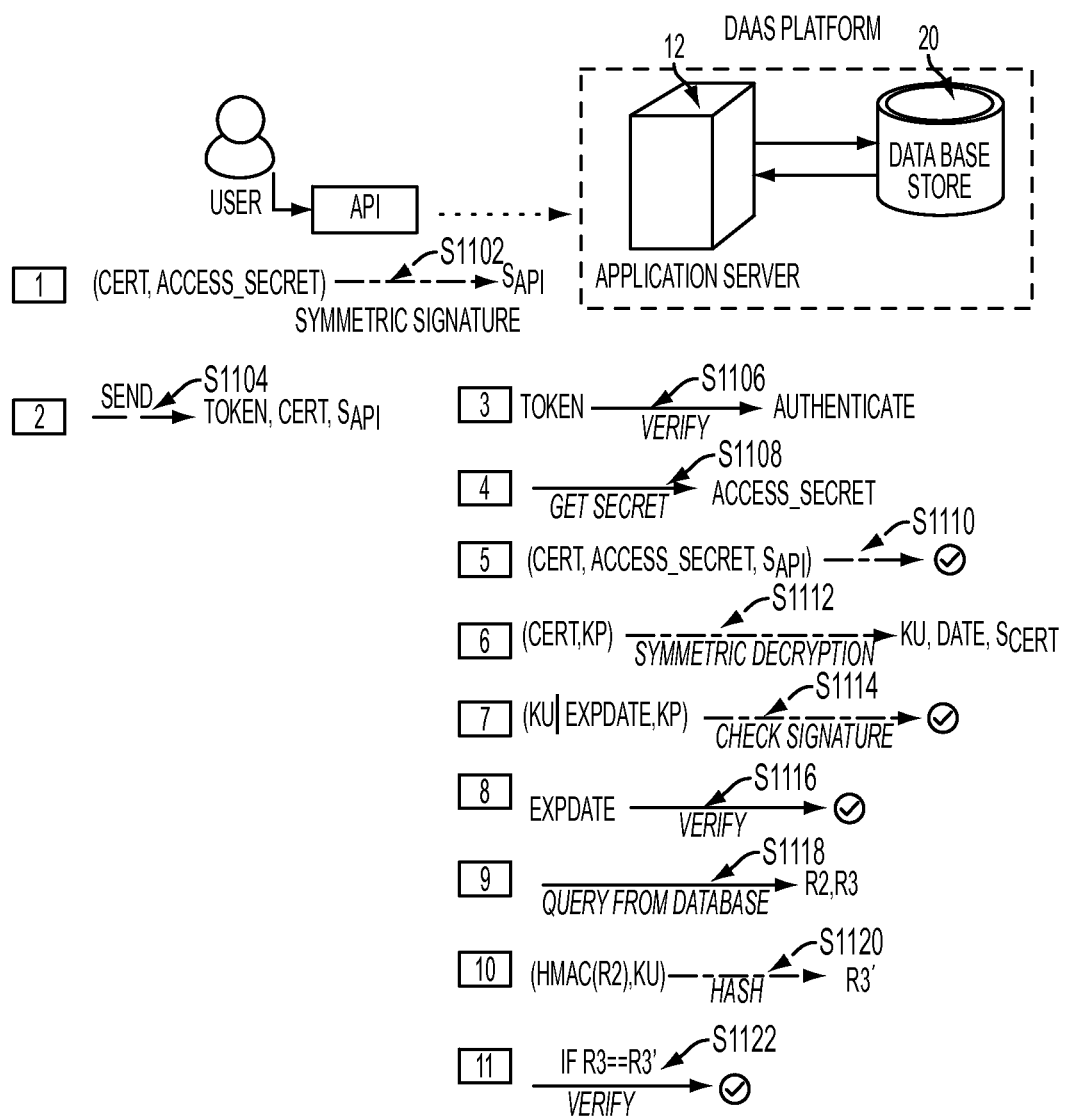
FIG. 12 is a flow chart illustrating verifying the user without needing the user password, following providing the user with API access, in the method of FIG. 2.

With reference now to FIG. 12, the following procedure may be implemented each time API access is sought.
1. On each API call, the user's client-side application is required to authenticate itself by signing the certificate, using the secret access key access_secret (S1102) to generate a signature $S_{API}$, and
2. send the authentication token together with the certificate and its signature $S_{API}$ to the server (S1104). These should all be sent together. This means that if an attacker captures the certificate alone, he would not be able to use it without having the signature or the authentication token.

On the server:
3. At each request, the system authenticates the token (S1108),
4. retrieves the secret access key access_secret for that user (S1110), and
5. verifies the signature $S_{API}$ of the user using the signed certificate and retrieved secret access key access_secret (S1112).
6. Then it decrypts the certificate to get the expiration date ExpDate, user's key KU, and $S_{cert}$ (S1114),
7. checks the signature $S_{cert}$ of the certificate (S1114),
8. checks whether or not the certificate is expired (S1116), to determine whether the user's user key KU is still valid, and optionally performs a further verification, as follows:
9. The database is queried to retrieve the two randoms R2, R3 (S1118)
10. The HMAC of R2 and KU is hashed giving R3' (S1120), and
11. R3 is compared with R3' to see if they match (S1120). If everything is verified satisfactorily, the user's request is then processed. This may include performing any of the steps previously described, such as database creation, database access, etc.

Figure 13:
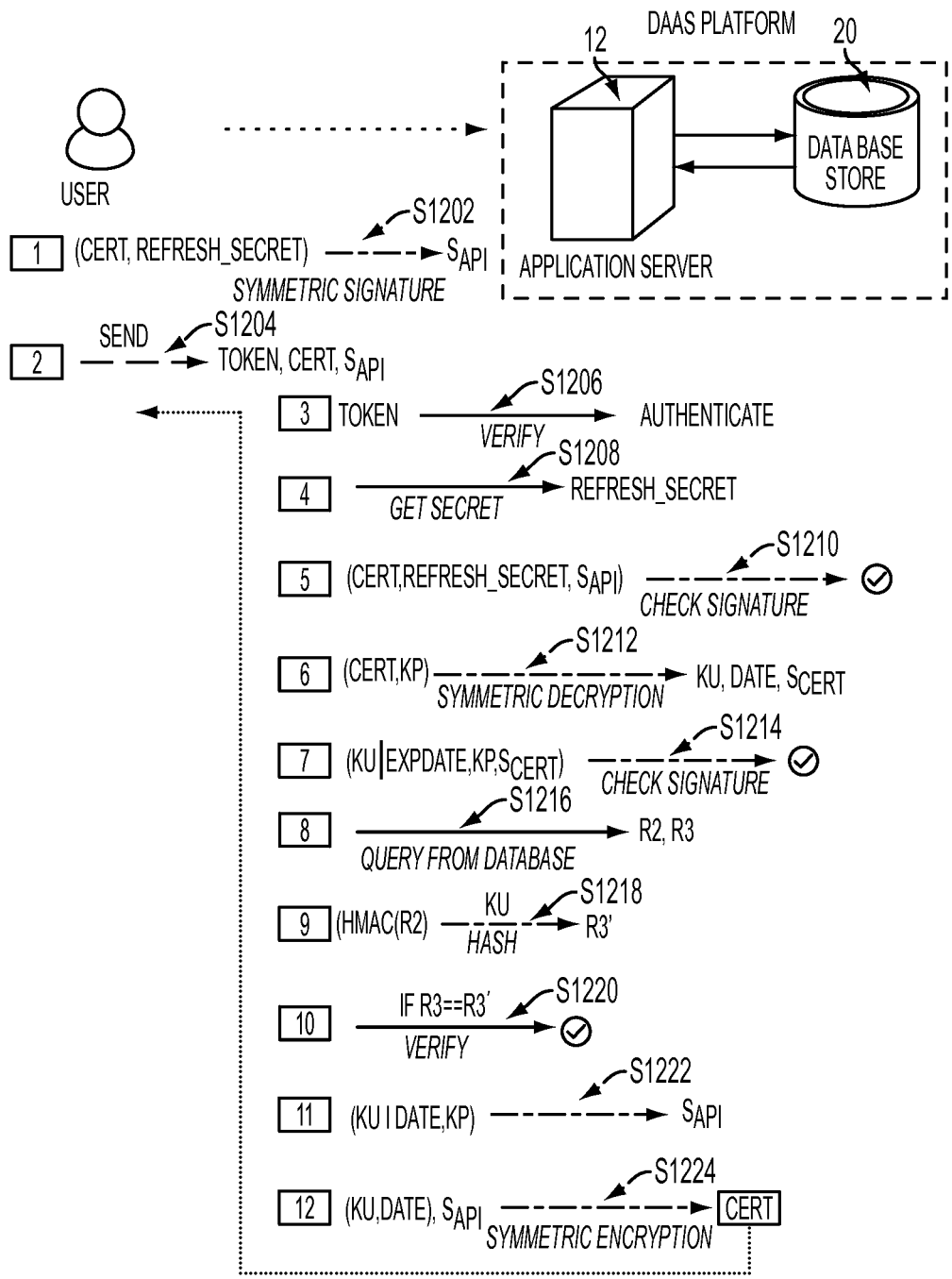
FIG. 13 is a flow chart illustrating refreshing the certificate for the user without needing the user password, following providing the user with API access, in the method of FIG. 2.

As noted above, the certificate contains an expiration date. The users may be provided with a mechanism to update their respective certificates using an API call. However, for non-repudiation reasons, the user is requested to sign the certificate again, but this time with another key. This is because if an attacker has captured the signatures of requests, he will not be able to employ them to update the certificate. So for each update call, the method may proceed as shown in FIG. 13:
1. the user is requested to sign the expired certificate using the refresh_secret key (S1202). The time stamp may also be required to be included in order to avoid further attacks.
2. The user sends the token, certificate and signature S to the server (S1204).

In this case, the server again verifies the validity of signatures and the correctness of the key. It then generates a new certificate and sends it back to the user. In particular:
3. At each request, the server authenticates the token (S1206),
4. retrieves the refresh_secret secret key (S1208) and
5. verifies the signature $S_{API}$ of the user (S1210).
6. Then it decrypts the user's key KU (S1212), and
7. checks the signature $S_{cert}$ of the certificate (S1214), and optionally performs the following verifications:
8. The database is queried to retrieve the two randoms R2, R3 (S1216)
9. The HMAC of R2 and KU is hashed giving R3' (S1218), and
10. R3 is compared with R3' to see if they match (S1220). If everything is verified satisfactorily, the user's request is then processed. This may include performing any of the steps previously described, such as database creation, database access, etc. If everything is verified satisfactorily, then user's request is then processed.
11. A new signature $S_{API}$ is created using a new date (S1222), and
12. A new certificate is created with the new date, the user key, and the signature $S_{API}$ and sent to the user (S1224).

H. Password Recovery

A password recovery method can be provided by the platform. Without such method, the user password used for encryption cannot be recovered, as it is not stored on the platform. So if a user forgets his or her password, it will not be possible to ask for a new password and restore the access to the databases. Additionally if the user is the only user of a database, the data may be lost. A secure password recovery mechanism may thus be provided for the platform.

At registration time, a series of challenge response questions (e.g., a minimum of 3 questions) will be asked from the user. The responses to all these questions are then put together to create a string. This string can then be used to create a key with which the password will be encrypted and saved on the server. At the time of clicking on the "Forgot Password?" link, an email is sent to the user that contains a link (which includes a long and hardly guessable random string) to the question page (a first step of user authentication). In the page, the same questions will be asked from the user. Using the answers the key will be recalculated by the key regeneration component 56. If the key is correct, then the password will be retrieved and the data can then be decrypted (second step of authentication). Finally, the user is asked to enter a new password.

The exemplary platform provides a complete solution for a secure semi-trusted DaaS. However, depending on the requirements of a specific platform, only some parts of the solution may be implemented. As examples, one or more of the following may be implemented:

In one embodiment, it is assumed that the data owners completely trust the data users. As a result the fingerprinting mechanism need not be implemented.

In some cases, the encryption of the data is not considered necessary, but the identification of malicious distribution of the data is desired. In this embodiment, the databases may be stored in a clear form on the platform, but they are fingerprinted at time of distribution. As a result, the fingerprinting stage may be implemented as follows: instead of encrypting the KM with K (which is the hash of KD and KP) at the time of database creation, it may be encrypted by KP. Consequently, at the moment of database access, the KM' is decrypted using KP.

While current DaaS services offer two types of systems, i.e., trusted and non-trusted, the present system can offer a semi-trusted service, alone or in combination with a trusted and/or a non-trusted platform. The exemplary semi-trusted platform provides for a DaaS solution where there is a balance between the level of trust and the complications of cryptographic processes and key management over the end-users. This means that by managing the keys and cryptographic operations, the system does not impose burdens on the user of non-trusted systems and by restricting the access for DBMS administrators to user's data while at rest, privacy and confidentiality for the users can be preserved. Additionally, by bringing fingerprinting solutions to the platform, assurance and traceability can be provided to the data owners.

The method illustrated in any one or more of FIGS. 3-13 may be implemented in a computer program product or products that may be executed on a computer or computers. The computer program product may comprise a non-transitory computer-readable recording medium on which a control program is recorded (stored), such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other non-transitory medium from which a computer can read and use. The computer program product may be integral with the computer 12 (for example, an internal hard drive of RAM), or may be separate (for example, an external hard drive operatively connected with the computer 12), or may be separate and accessed via a digital data network such as a local area network (LAN) or the Internet (for example, as a redundant array of inexpensive of independent disks (RAID) or other network server storage that is indirectly accessed by the computer 12, via a digital network). A thin client may be sent by the system 10 to the user devices which installs the components 86, 77, 90, 92, on the user device.

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in one or more of FIGS. 3-13, can be used to implement the method for semi-trusted shared access to a database. As will be appreciated, while the steps of the method may all be computer implemented, in some embodiments one or more of the steps may be at least partially performed manually.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for providing shared access to a database comprising:
for each of a set of users, providing for regenerating a respective user key based on a respective predefined user input to a system;
for each of the set of users that is authorized to have access to an encrypted database,
generating a key pair, the key pair comprising a secret key and a public key;
encrypting the secret key with the user's key to generate an encrypted secret key, whereby the secret key is able to be later decrypted from the encrypted secret key with the user's key;
encrypting a database key for that database with the public key to generate an asymmetrically encrypted database key;
encrypting the database key for that database with the respective user's user key to generate an encrypted database key, whereby the database key is able to be subsequently decrypted from the asymmetrically encrypted database key with the secret key; and
during a user session, providing one of the authorized users with access to the encrypted database by decrypting the database key from the encrypted database key with the respective user's user key, and decrypting the database, from the encrypted database, with the database key, the database key and each user's user key being inaccessible to the system between user sessions;
wherein the providing for regenerating the respective user key, encrypting the database key with the public key, encrypting the database key with the respective user's user key, and providing one of the authorized users with access is performed with a processor.

2. The method of claim 1, wherein the user input comprises a user password or its hash and the user key is generated by hashing the user password or its hash with a stored salt.

3. The method of claim 2, further comprising generating the salt from a user identifier for the same user.

4. The method of claim 1, further comprising generating a random string by hashing the user key, and comparing the random string with a previously-generated random string generated by hashing the user key and authenticating the user when the random strings match.

5. The method of claim 1, further comprising providing for one of the users that is an owner of the database to select a part of the database for inserting a fingerprint in the selected part of the database which identifies an authorized user accessing the database.

6. The method of claim 5, further comprising providing for detecting an unauthorized distribution of data from the database based on the presence of the fingerprint in the data.

7. The method of claim 1, further comprising providing for access to the database through an application programming interface.

8. The method of claim 1, further comprising providing for recovering a user's password by providing for generating a symmetric key based on answers to questions provided by the user, encrypting the password with the symmetric key, and storing the encrypted password received from the user, whereby when the user resubmits the answers to the questions, the encrypted password is able to be decrypted by retrieving the stored encrypted password and decrypting the encrypted password with the regenerated symmetric key.

9. The method of claim 1, further comprising deleting the database key and each authorized user's user key from system memory so that the database remains encrypted until an authorized user submits the respective user input, whereby the respective user key is able to be regenerated and used to decrypt the encrypted database key to generate the database key for decryption of the database.

10. The method of claim 1, wherein the providing for regenerating the respective user key based on the respective predefined user input comprises, on an application server of the system, during the user session, receiving a hashed user password and a user identifier from a client device in communication with the application server; and wherein the regenerating of the user key comprises hashing the user password with a salt generated from the user identifier; and the method further comprises, after decrypting the encrypted database on the platform to provide database data accessible to the user, terminating the user session, the hashed user password, user key, and the database key not being stored on the platform after the termination of the user session, so that the database key is not available for decrypting the database until a user key is subsequently generated.

11. A method for providing shared access to a database comprising:

for each of a set of users, providing for regenerating a respective user key based on a respective predefined user input to a system;

for each of the set of users that is authorized to have access to an encrypted database, encrypting a database key for that database with the respective user's user key to generate an encrypted database key; and during a user session, providing one of the authorized users with access to the encrypted database by decrypting the database key from the encrypted database key with the respective user's user key, and decrypting the database, from the encrypted database, with the database key, the database key and each user's user key being inaccessible to the system between user sessions, providing for one of the users that is an owner of the database to select a part of the database for inserting a fingerprint in the selected part of the database which identifies an authorized user accessing the database, wherein the fingerprint is generated by hashing a user identifier of an authorized user accessing the database with a fingerprinting key that is stored as an encrypted fingerprinting key, the encrypted fingerprinting key being generated by symmetrically encrypting the fingerprinting key with a key that is generated based on the database key and a platform key, p1 wherein at least one of the providing for generating the respective user key, encrypting of the database key, and providing one of the authorized users with access is performed with a processor.

12. The method of claim 11, further comprising, for each of the set of users, prior to encrypting the database key with the respective user's user key:

generating a key pair, the key pair comprising a secret key and a public key;

encrypting the secret key with the user's key to generate an encrypted secret key, whereby the secret key is able to be later decrypted from the encrypted secret key with the user's key;

encrypting the database key with the public key to generate an asymmetrically encrypted database key, whereby the database key is able to be subsequently decrypted from the asymmetrically encrypted database key with the secret key.

13. A method for providing shared access to a database comprising:

for each of a set of users, providing for regenerating a respective user key based on a respective predefined user input to a system;

for each of the set of users that is authorized to have access to an encrypted database, encrypting a database key for that database with the respective user's user key to generate an encrypted database key; and during a user session, providing one of the authorized users with access to the encrypted database by decrypting the database key from the encrypted database key with the respective user's user key, and decrypting the database, from the encrypted database, with the database key, the database key and each user's user key being inaccessible to the system between user sessions, the providing for access to the database being through an application programming interface and comprising providing one of the users with a token, a certificate, and a secret access key, and wherein the user input comprises the token, the certificate, and a signature generated by signing the certificate with the secret access key;

wherein at least one of the providing for generating the respective user key, encrypting of the database key, and providing one of the authorized users with access is performed with a processor.

14. A system for providing shared access to an associated database comprising:

a user authentication component which is configured for receiving a hashed password for a user and generating a respective user key based on the hashed password and a stored salt;

a database encryption component, which for each of a set of users that is authorized to have access to an encrypted database, encrypts a database key with the respective user's user key to generate an encrypted database key, the database key being configured for decrypting the database from encrypted database, the database encryption component being also configured for generating a key pair, the key pair comprising a secret key and a public key, encrypting the secret key with the user's key to generate an encrypted secret key which is able to be later decrypted with the user's key, and encrypting the database key with the public key to generate an asymmetrically encrypted database key, whereby the asymmetrically encrypted database key is able to be decrypted with the secret key to regenerate the database key;

a database access component which provides access to the encrypted database when an authorized user submits the respective hashed password, whereby the respective user key is generated and used to decrypt the encrypted database key to generate the database key for decryption of the database; and a hardware processor, which implements the user authentication component, database encryption component, and database access component.

15. The system of claim 14, further comprising a fingerprinting component for inserting a fingerprint into a database at access time, the fingerprinting component providing for one of the users that is an owner of the database to select a part of the database into which the fingerprint is to be inserted, the inserted fingerprint identifying an authorized user requesting access to the database.

16. The system of claim 14, further comprising an API component which providing for access to the database through an application programming interface.

17. The system of claim 14, further comprising a password regeneration component which stores an encrypted password that has been generated by encrypting a user's password with a symmetric key based on answers to questions provided by the user, whereby when the user resubmits the answers to the questions, the encrypted password is able to be decrypted from the stored encrypted password.

\* \* \* \* \*